United States Patent
Geng

(10) Patent No.: US 10,659,394 B2
(45) Date of Patent: May 19, 2020

(54) METHOD AND APPARATUS FOR EXTRACTING DATA STREAM INFORMATION IN LOW-LATENCY MODE BY ETHERNET CHIP

(71) Applicant: Centec Networks (Suzhou) Co., Ltd., Suzhou (CN)

(72) Inventor: Lei Geng, Suzhou (CN)

(73) Assignee: Centec Networks (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 16/300,317

(22) PCT Filed: Feb. 9, 2017

(86) PCT No.: PCT/CN2017/073156
§ 371 (c)(1),
(2) Date: Nov. 9, 2018

(87) PCT Pub. No.: WO2018/120355
PCT Pub. Date: Jul. 5, 2018

(65) Prior Publication Data
US 2019/0116134 A1    Apr. 18, 2019

(30) Foreign Application Priority Data
Dec. 27, 2016 (CN) .......................... 2016 1 1225817

(51) Int. Cl.
*H04L 12/931* (2013.01)
*H04L 12/26* (2006.01)
(Continued)

(52) U.S. Cl.
CPC .......... *H04L 49/351* (2013.01); *H04L 43/08* (2013.01); *H04L 43/0852* (2013.01);
(Continued)

(58) Field of Classification Search
None
See application file for complete search history.

(56) References Cited

U.S. PATENT DOCUMENTS

2004/0120333 A1* 6/2004 Geddes .................. H04L 49/90
370/411

* cited by examiner

*Primary Examiner* — Yaotang Wang
(74) *Attorney, Agent, or Firm* — Wang Law Firm, Inc.

(57) ABSTRACT

The present invention discloses a method and an apparatus for extracting data stream information by an Ethernet switch chip in a low-latency mode. The method includes: setting, by a data feature extraction module, one piece of starting information including feature information and one piece of ending information including a packet length; performing matching, by a data stream feature comparison module, on the feature information, and if the matching succeeds, sending the starting information and the ending information to a module for collecting statistics on data stream information; and combining, by the module for collecting statistics on data stream information, the feature information in the starting information and the packet length in the ending information into one piece of data stream information, and sending the data stream information to a CPU. By using the method and the apparatus disclosed in the present invention, not only a low-latency requirement is satisfied, but also entire data stream information can be extracted and reported to the CPU, facilitating network management.

5 Claims, 2 Drawing Sheets

(51) Int. Cl.
*H04L 29/06* (2006.01)
*H04L 12/863* (2013.01)
*H04L 12/823* (2013.01)
*H04L 12/833* (2013.01)

(52) U.S. Cl.
CPC .............. *H04L 43/16* (2013.01); *H04L 47/31* (2013.01); *H04L 47/32* (2013.01); *H04L 47/50* (2013.01); *H04L 69/22* (2013.01)

METHOD AND APPARATUS FOR EXTRACTING DATA STREAM INFORMATION IN LOW-LATENCY MODE BY ETHERNET CHIP

TECHNICAL FIELD

The present invention relates to the technical field of network data stream processing of an Ethernet switch chip, and specifically, to a method and an apparatus for extracting data stream information by an Ethernet switch chip in a low-latency mode.

BACKGROUND

As a network develops towards big data and intelligence, a network manager needs more means to monitor network behaviors. A conventional Ethernet switch chip reports expected data stream information such as a destination physical address and a packet length to a CPU. In the age of big data, a network latency becomes a very important indicator. The Ethernet switch chip needs to work in a low-latency mode. In other words, the Ethernet switch chip does not need to receive an entire packet, and needs to receive only a small amount of data before sending the data.

The prior art proposes a data stream information extraction method. As shown in FIG. 1, the method includes the following steps: The Ethernet switch chip receives a packet, where the format of the packet conforms to the standard Ethernet protocol, and a data feature parsing module may parse out feature information corresponding to the packet; data stream feature information needing to be extracted is preset in the chip, where the feature information may include multiple pieces of information; a data stream feature comparison module compares the feature information corresponding to the packet received by the chip with the preset feature information, where if matching succeeds, it indicates that the packet belongs to an expected data stream; and information about the packet whose feature information is successfully matched is sent to a module for collecting statistics on data stream information, and the module sends packet information satisfying a requirement to a CPU.

However, by using the foregoing method, when Ethernet switch chip works in the low-latency mode, the information reported to the CPU by the module for collecting statistics on data stream information does not include length information of the packet, but the length information is one of pieces of important information needed by the network manager.

SUMMARY

For deficiency of the prior art, a main objective of the present invention is to provide a method and an apparatus for extracting data stream information by an Ethernet switch chip in a low-latency mode, so that information reported by an Ethernet switch chip in a low-latency mode to a CPU can include length information of a packet.

To implement the foregoing objective, the present invention discloses a method for extracting data stream information by an Ethernet switch chip in a low-latency mode, specifically including:

parsing out, by a data feature extraction module, feature information corresponding to a packet, setting one piece of starting information including the feature information and one piece of ending information including a packet length, and sending the starting information and the ending information to a data stream feature comparison module;

after receiving the starting information, comparing, by the data stream feature comparison module, the feature information with preset feature information, and if the feature information matches the preset feature information, sending the starting information to a module for collecting statistics on data stream information, and setting a sending flag bit to effective;

after receiving the ending information, determining, by the data stream feature comparison module, whether the sending flag bit is effective, and if the sending flag bit is effective, sending the ending information to the module for collecting statistics on data stream information, and resetting the sending flag bit, or otherwise, skipping sending but discarding the ending information; and receiving and storing, by the module for collecting statistics on data stream information, the starting information, reading the starting information after receiving the ending information, combining the feature information in the starting information and the packet length in the ending information into one piece of data stream information, and sending the data stream information to a CPU.

Preferably, the feature information includes a destination physical address, a source physical address, and a virtual local area network number.

Preferably, the packet length is calculated according to a starting identifier and an ending identifier of receiving the packet.

Preferably, when the feature information is successfully matched, the sending flag bit is set to 1.

Preferably, before the sending, by the module for collecting statistics on data stream information, the data stream information to a CPU, the method further includes:

temporarily storing, by the module for collecting statistics on data stream information, the data stream information, accumulating information about a packet length received each time, and sending the temporarily stored data stream information to the CPU when a sum of packet lengths is greater than or equal to a threshold.

Correspondingly, the present invention further provides an apparatus for extracting data stream information by an Ethernet switch chip in a low-latency mode, specifically including:

a data feature extraction module, configured to parse out feature information corresponding to a packet, and set one piece of starting information including the feature information and one piece of ending information including a packet length;

a data stream feature comparison module, configured to perform matching on the feature information, if the matching succeeds, send the starting information to a module for collecting statistics on data stream information, and set a sending flag bit to effective; and the module for collecting statistics on data stream information, configured to receive the starting information and the ending information, combine the feature information and the length information into one piece of data stream information, and send the data stream information to a CPU.

Compared with the prior art, advantages of the present invention are as follows: In the method and the apparatus for extracting data stream information by an Ethernet switch chip in a low-latency mode, when Ethernet switch chip works in the low-latency mode, specified data stream information is extracted in real time, so that not only a low-latency requirement is satisfied, but also entire data stream information can be extracted and reported to the CPU, facilitating network management.

DESCRIPTION OF THE EMBODIMENTS

In view of deficiency of the prior art, an inventor of this solution proposes the technical solutions of the present invention through long-term research and practice. The technical solutions, the implementation process, the principle, and the like are further described below.

To make the objective, the technical solutions, and the advantages of the present invention clearer, the present invention is further described in detail below with reference to the accompanying drawings and embodiments. It should be understood that the specific embodiments described herein are merely used to explain the present invention but are not intended to limit the present invention.

Figure 1:
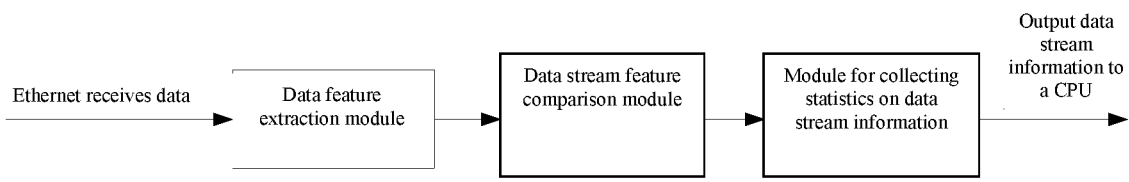
FIG. 1 is a schematic diagram of a data stream information extraction method in the prior art.
Figure 2:
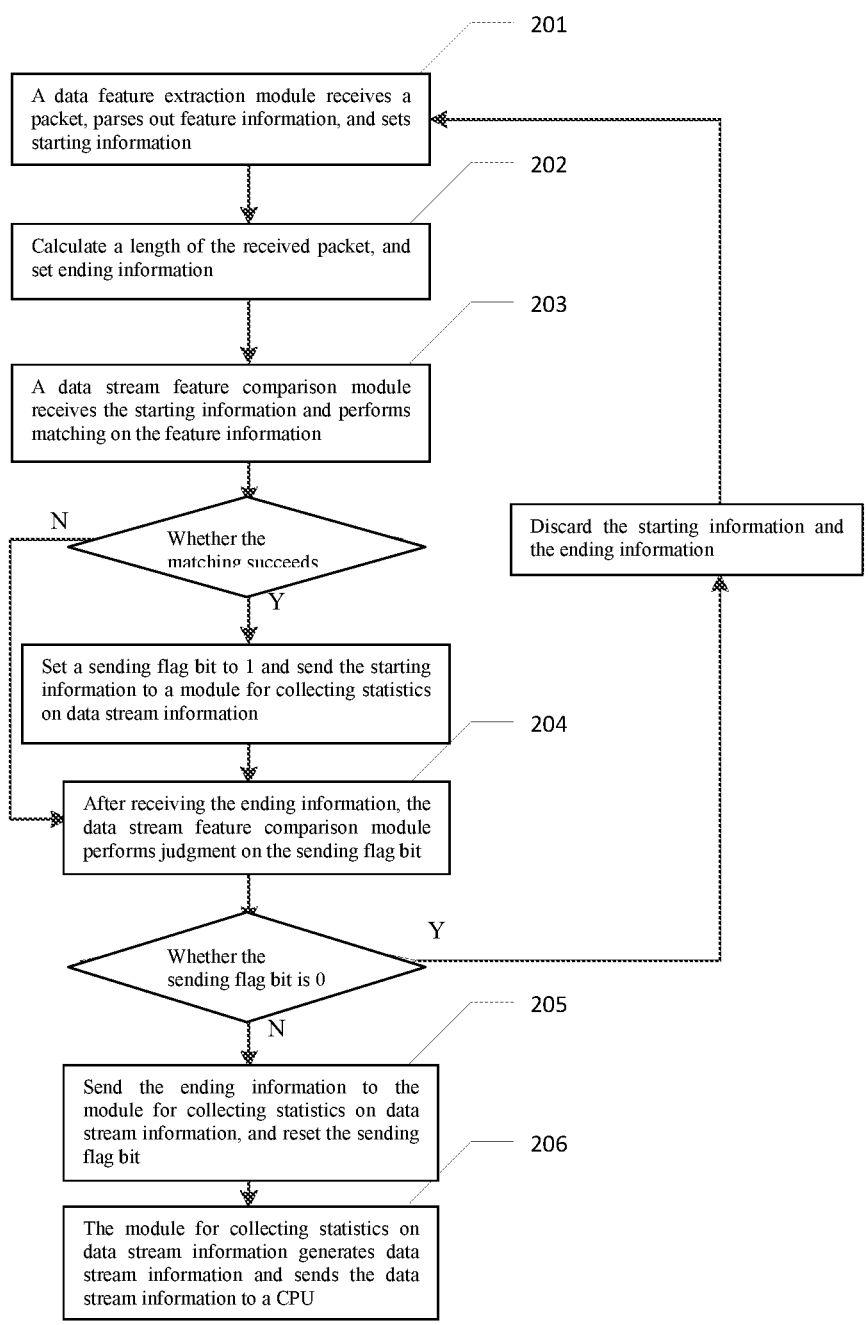
FIG. 2 is a flowchart of a method for extracting data stream information by an Ethernet switch chip in a low-latency mode according to an embodiment of the present invention.

FIG. 2 is a flowchart of a method for extracting data stream information by an Ethernet switch chip in a low-latency mode according to an embodiment of the present invention. As shown in FIG. 2, the method specifically includes the following steps.

Step 201. A data feature extraction module receives a packet, parses out feature information, and sets starting information.

The data feature extraction module parses out the feature information corresponding to the packet with reference to the Ethernet packet composition protocol and according to a starting identifier of receiving the packet, and sets one piece of starting information. The information includes the feature information that is parsed out, but does not include information about a packet length.

Step 202. Calculate a length of the received packet, and set ending information.

In the foregoing step, the length of the packet is counted when the starting information is set, and the entire length of the received packet may be calculated according to an ending identifier of receiving the packet, and one piece of ending information is set. The information includes the packet length.

Step 203. A data stream feature comparison module receives the starting information and performs matching on the feature information.

After receiving the starting information, the data stream feature comparison module compares the feature information corresponding to the packet received by a chip with preset feature information. If the matching succeeds, it indicates that the packet belongs to an expected data stream, and the starting information of the packet is sent to a module for collecting statistics on data stream information, and at the same time, a sending flag bit is set to effective. If the matching fails, step 204 is directly performed.

The sending flag bit is a preset identifier, is used to represent whether the matching on the feature information succeeds, and is an ineffective value 0 by default. In this embodiment, an effective bit is 1.

Step 204. After receiving the ending information, the data stream feature comparison module determines whether the sending flag bit is 0.

After the ending information is received, first, the sending flag bit is checked, and if the flag bit is effective, step 205 is performed, or otherwise, the current starting information and ending information are discarded, and step 201 is performed to process a new packet.

Step 205. Send the ending information to the module for collecting statistics on data stream information, and reset the sending flag bit.

Step 206. The module for collecting statistics on data stream information generates data stream information and sends the data stream information to a CPU.

After receiving the starting information, the module for collecting statistics on data stream information temporarily stores the information, reads the stored starting information after receiving the ending information, combines the packet length in the ending information and the feature information into one piece of entire data stream information, and if the data stream information satisfies a reporting requirement after being processed, submits the data stream information to the CPU.

Generally, during actual use, to reduce CPU load, not each piece of data stream information needs to be sent to the CPU, the data stream information may be temporarily stored, and packet length information received each time is accumulated. After the length information satisfies a particular requirement, for example, a total sum of received packet lengths is greater than or equal to a threshold, the information is reported to the CPU.

In the technical solution of the present invention, when Ethernet switch chip works in the low-latency mode, specified data stream information is extracted in real time by setting two information channels: starting information and ending information, so that not only a low-latency requirement can be satisfied, but also entire data stream information can be extracted and reported to the CPU, facilitating network management.

Figure 3:
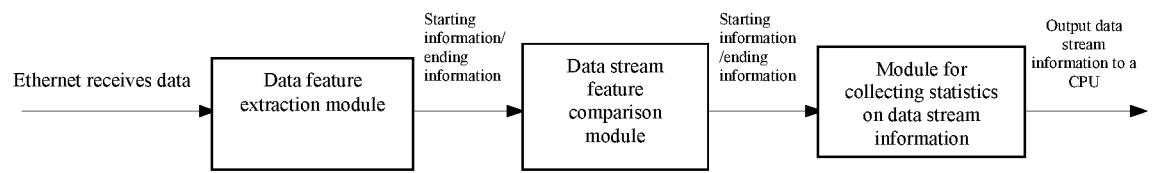
FIG. 3 is a schematic diagram of an apparatus for extracting data stream information by an Ethernet switch chip in a low-latency mode according to an embodiment of the present invention.

Correspondingly, an embodiment of the present invention provides an apparatus for extracting data stream information by an Ethernet switch chip in a low-latency mode. A schematic diagram of the apparatus is shown in FIG. 3, and the apparatus specifically includes:

a data feature extraction module, configured to parse out feature information corresponding to a packet, and set one piece of starting information including the feature information and one piece of ending information including a packet length;

a data stream feature comparison module, configured to perform matching on the feature information, if the matching succeeds, send the starting information to a module for collecting statistics on data stream information, and set a sending flag bit to effective; and the module for collecting statistics on data stream information, configured to receive the starting information and the ending information, combine the feature information and the length information into one piece of data stream information, and send the data stream information to a CPU.

Because the method for extracting data stream information in a low-latency mode provided in the present invention is used in a specific working process of the apparatus, details are not described herein again.

It should be understood that the foregoing embodiments are merely used to describe the technical ideas and features of the present invention, and an objective thereof is to enable a person familiar with the technology to understand and implement content of the present invention, but the protection scope of the present invention is not limited thereto. Any equivalent change or modification made based on the spirit and essence of the present invention should fall within the protection scope of the present invention.

What is claimed is:

1. A method for extracting data stream information by an Ethernet switch chip in a low-latency mode, comprising:
   parsing out, by a data feature extraction module, feature information corresponding to a packet, setting one piece of starting information comprising the feature information and one piece of ending information comprising a packet length, and sending the starting information and the ending information to a data stream feature comparison module;
   after receiving the starting information, comparing, by the data stream feature comparison module, the feature information with preset feature information, and if matching succeeds, sending the starting information to a module for collecting statistics on data stream information, and setting a sending flag bit to effective;
   after receiving the ending information, determining, by the data stream feature comparison module, whether the sending flag bit is effective, and if the sending flag bit is effective, sending the ending information to the module for collecting statistics on data stream information, and resetting the sending flag bit, or otherwise, skipping sending but discarding the ending information; and
   receiving and storing, by the module for collecting statistics on data stream information, the starting information, reading the starting information after receiving the ending information, combining the feature information in the starting information and the packet length in the ending information into one piece of data stream information, and sending the data stream information to a CPU.

2. The method for extracting data stream information by an Ethernet switch chip in a low-latency mode according to claim 1, wherein the feature information comprises a destination physical address, a source physical address, and a virtual local area network number.

3. The method for extracting data stream information by an Ethernet switch chip in a low-latency mode according to claim 1, wherein the packet length is calculated according to a starting identifier and an ending identifier of receiving the packet.

4. The method for extracting data stream information by an Ethernet switch chip in a low-latency mode according to claim 1, wherein when the feature information is successfully matched, the sending flag bit is set to 1.

5. The method for extracting data stream information by an Ethernet switch chip in a low-latency mode according to claim 1, wherein before the sending, by the module for collecting statistics on data stream information, the data stream information to a CPU, the method further comprises:
   temporarily storing, by the module for collecting statistics on data stream information, the data stream information, accumulating information about a packet length received each time, and sending the temporarily stored data stream information to the CPU when a sum of packet lengths is greater than or equal to a threshold.

* * * * *